Sept. 23, 1958 W. T. HERREN ET AL 2,853,267
BUTTERFLY VALVE
Filed Feb. 17, 1955 4 Sheets-Sheet 1
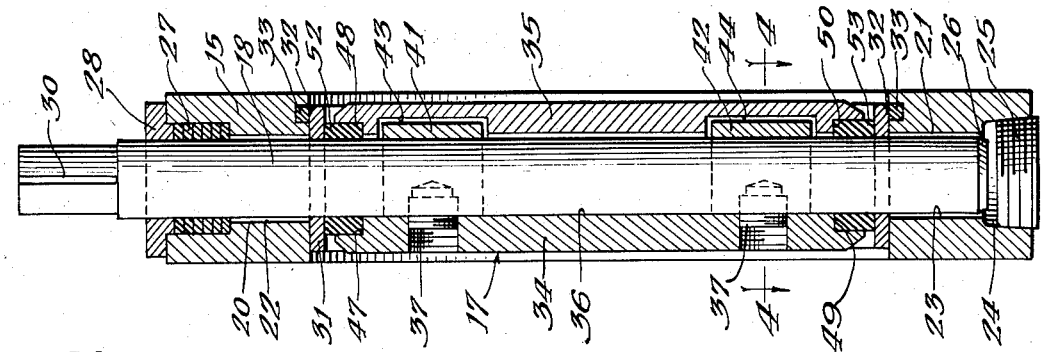
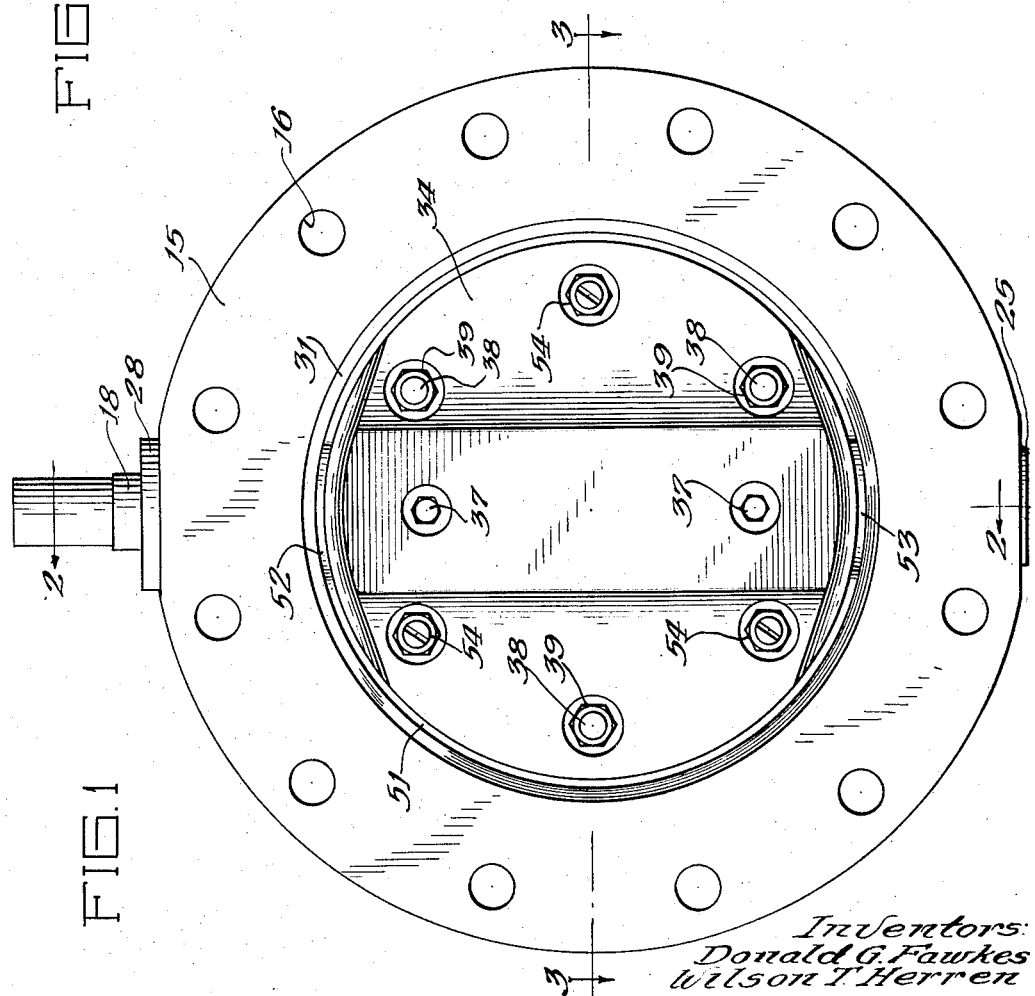
Inventors:
Donald G. Fawkes
Wilson T. Herren
By: Schroeder, Hofgren,
Brady & Wegner
Attorneys Sept. 23, 1958   W. T. HERREN ET AL   2,853,267
BUTTERFLY VALVE
Filed Feb. 17, 1955   4 Sheets-Sheet 2
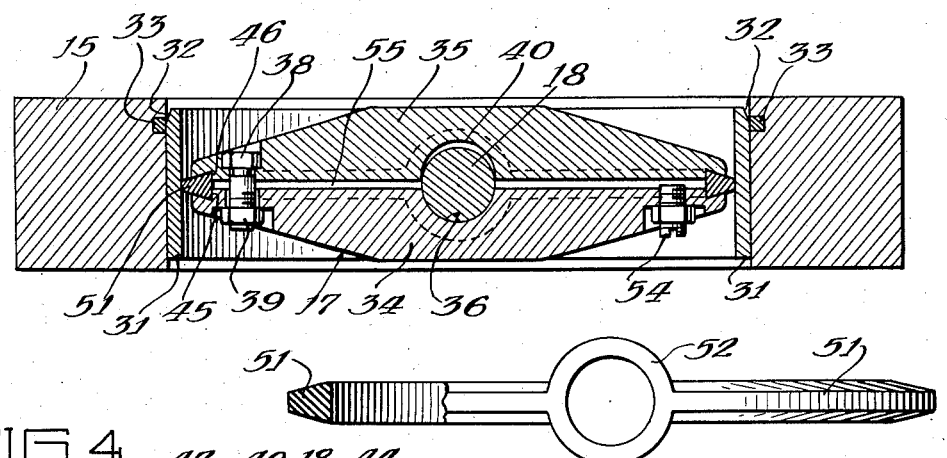
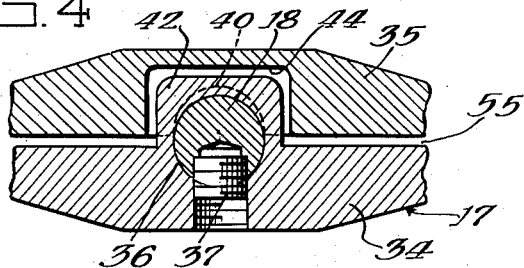
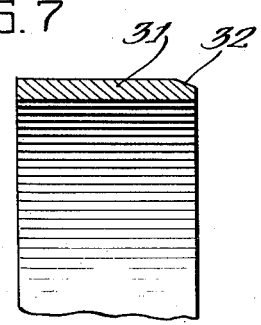
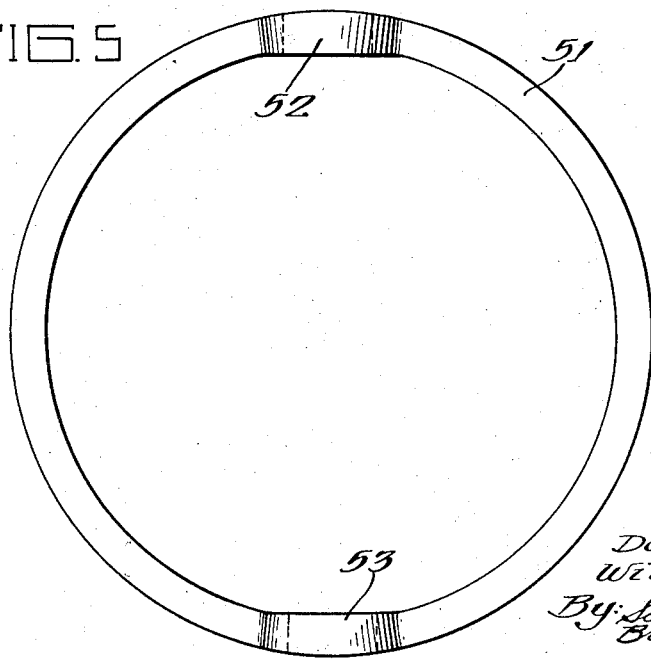
Inventors:
Donald G. Fawkes
Wilson T. Herren
By: Schroeder, Hofgren,
Brady & Wegner
Attorneys Sept. 23, 1958  W. T. HERREN ET AL  2,853,267
BUTTERFLY VALVE
Filed Feb. 17, 1955  4 Sheets-Sheet 3

Inventors:
Donald G. Fawkes
Wilson T. Herren
By: Schroeder, Hofgren,
Brady & Wegner
Attorneys

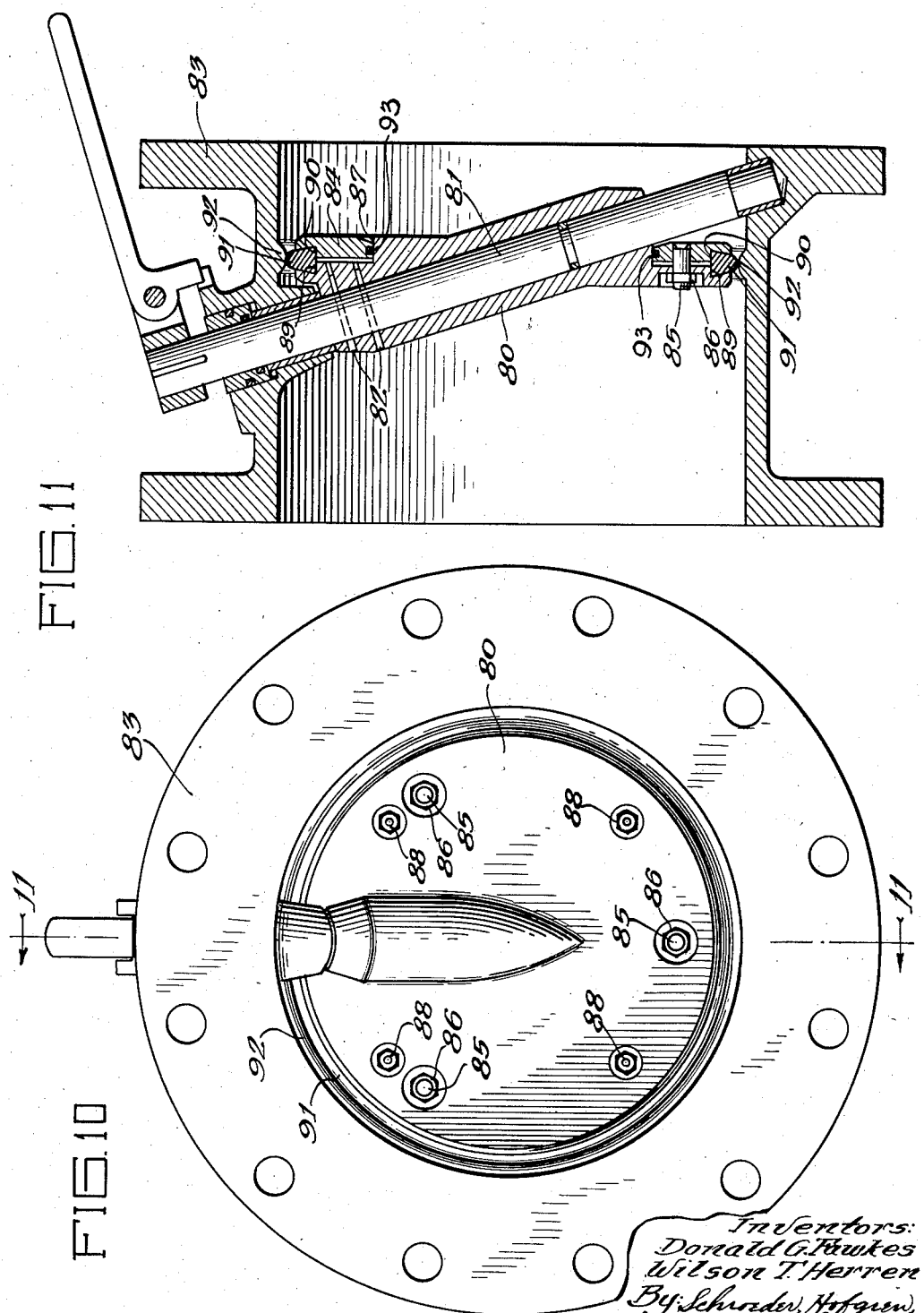

United States Patent Office 2,853,267
Patented Sept. 23, 1958

2,853,267
BUTTERFLY VALVE

Wilson T. Herren, Barrington, and Donald G. Fawkes, Chicago, Ill., assignors to Henry Pratt Company, a corporation of Illinois Application February 17, 1955, Serial No. 488,740

8 Claims. (Cl. 251—175)

This invention relates to butterfly valves, and more particularly to large high pressure butterfly valves used in the mains of a city water system, filtration plant, or the like.

The primary object of the present invention is to provide a new and improved butterfly valve which will withstand high pressure without leaking. The valves have been used with exceptional results, particularly in the mains of filtration plants, and valves varying in size from ten inches in diameter to twenty-four inches in diameter have been found to withstand water works pressures up to 125 p. s. i. without leakage.

Another object of the invention is to provide a butterfly valve gate which has a forward pressure plate adapted to be moved rearwardly a limited distance by upstream pressure to press the valve sealing ring into sealing engagement with the valve seat.

A further object of the invention is to provide a butterfly valve gate which may be adjusted in place within the valve housing to assure that the proper sealing engagement is obtained between the valve sealing ring and the valve seat. Because of the fact that the valve gate may be adjusted in place within the valve housing, manufacturing tolerances between the valve seat and the sealing ring held in the periphery of the valve gate need not be so closely maintained, and a considerable savings in manufacturing cost is realized.

Figure 9:
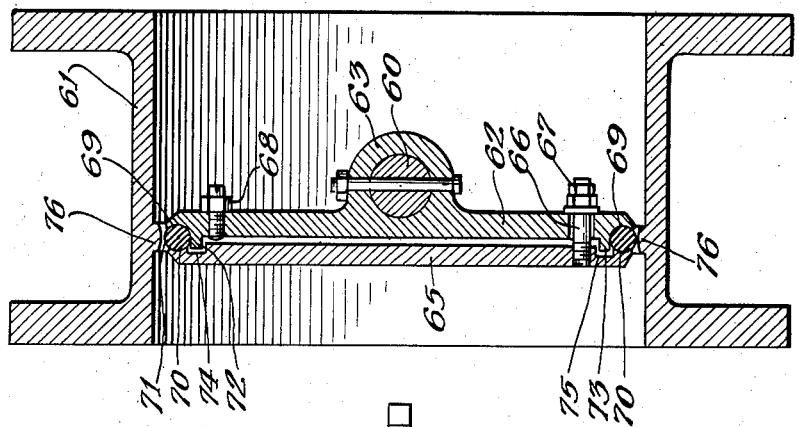
Figure 8:
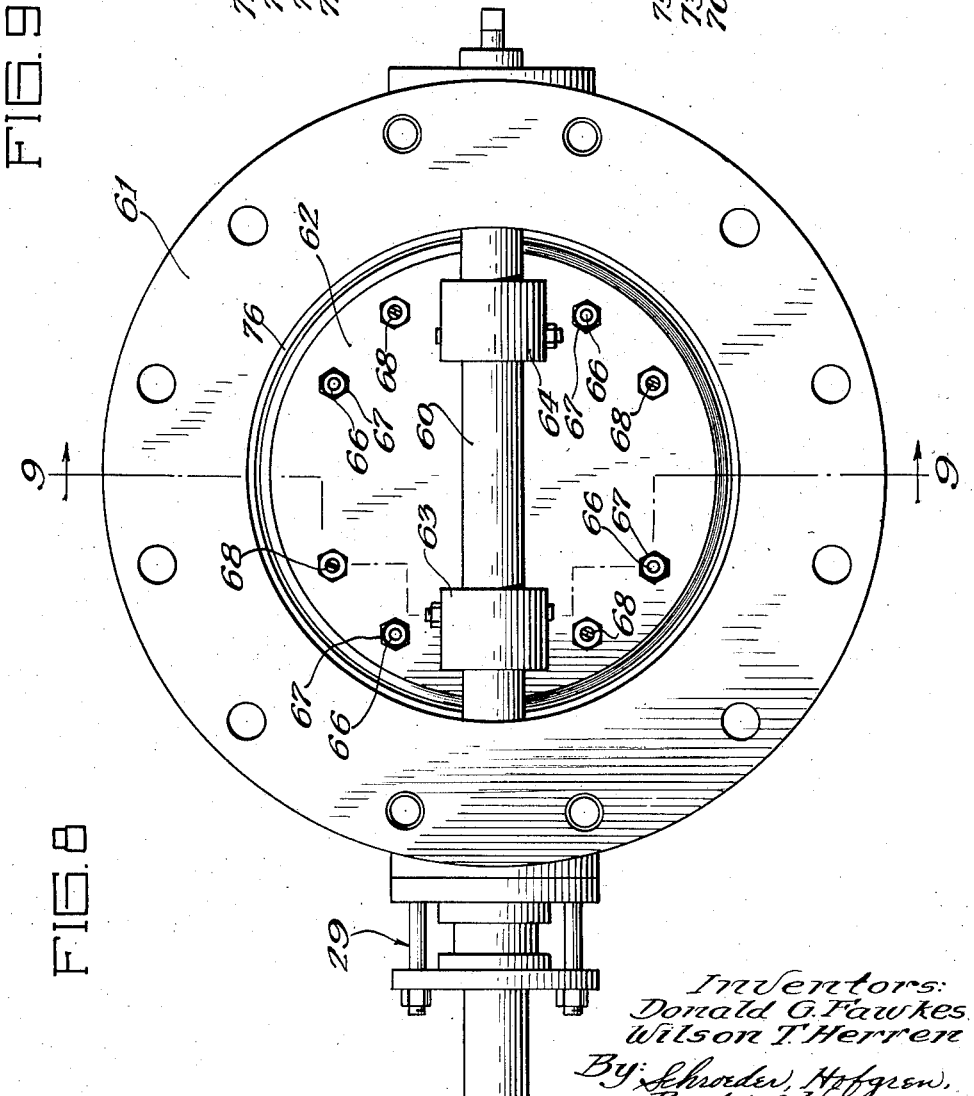

The invention is illustrated in a preferred embodiment in the accompanying drawings, in which:

Fig. 1 is an elevational view of the valve;

Fig. 2, a sectional view taken as indicated on line 2—2 of Fig. 1;

Fig. 3, a sectional view taken as indicated on line 3—3 of Fig. 1;

Fig. 4, a sectional view taken as indicated on line 4—4 of Fig. 2;

Fig. 5, a plan view of the valve sealing ring;

Fig. 6, a broken top plan view, partly in section, of the valve sealing ring;

Fig. 7, a fragmentary sectional view of the valve seat ring;

Fig. 8, an elevational view of a modified form of the invention;

Fig. 9, a sectional view taken as indicated on line 9—9 of Fig. 8;

Fig. 10, an elevational view of a second modified form of the invention showing a valve having a skewed shaft; and Fig. 11, a sectional view taken as indicated on line 11—11 of Fig. 10.

In the embodiment illustrated, a hollow cylindrical valve housing or body 15 is provided with a plurality of circumferentially spaced openings 16 adapted to receive bolts (not shown) so that the butterfly valve may be conveniently secured to the flanges of the water mains in a water system. The central opening in the housing 15 may vary in size from six to twenty-four inches, and it is closed by a gate, generally designated 17, secured to a rotatable shaft 18.

Each of the opposite end portions of the shaft 18 are journaled in a sleeve bearing insert, 20 and 21, provided in a pair of diametrically opposed housing openings, 22 and 23. The bearing inserts 20 and 21 are preferably formed from a material known as Oilite, which is a pressed powdered bearing bronze.

A threaded opening 24 may be drilled and tapped concentric with the housing opening 23 to receive a pipe plug 25 which closes the opening. The opposite end of the shaft 18 is provided with O-ring packing 27 in the housing opening 22 and is held in place by a gland flange 28 and a conventional stuffing box of the type shown at 29 in Fig. 8. A keyway 30 may be provided in the exposed end of the shaft 18 to accommodate a conventional lever handle or gear arrangement for turning the shaft.

An annular valve seat 31, preferably made of brass, may be press fitted within the inner annular surface of the central opening of the housing 15. The outer forward edge 32 of the valve seat 31 is preferably tapered so that it may be more easily pressed into position, and an O-ring seal 33 is recessed in the forward portion of the valve housing 15 to prevent leakage between the inserted seat 31 and the inner annular surface of the valve housing 15.

The valve gate, generally designated 17, may include a rear valve disk 34 and a movable front pressure plate 35. The disk 34 preferably has a transversely extending channel 36 which makes a close mating fit with a portion of the curved surface of the shaft 18 and is secured to the shaft by a pair of pipe plugs 37.

As can be seen in Figs. 1 and 3, the rear disk 34 and the front pressure plate 35 are preferably secured together by bolts 38 and nuts 39 recessed in opposite faces of the gate 17 and adapted to provide a lost motion connection between the disk 34 and the plate 35. The amount of play between the disk 34 and the plate 35 may be increased or decreased as desired by simply adjusting the nuts 39 on the bolts 38. As can be seen in Fig. 3, the movable front pressure plate 35 is provided with a transversely extending channel 40, similar to the one in the disk 34, so that when the disk 34 and plate 35 are brought closely together, the channel 40 fits snugly about the forward curved surface of the shaft 18.

The rear disk 34 is provided with a pair of integral guiding abutments 41 and 42 through which the shaft 18 is permitted to pass. Each of the abutments is received in a cooperating recessed portion, 43 and 44, in the front pressure plate 35 to assist in maintaining the pressure plate 35 in concentric alignment with the disk 34. The recessed portions 43 and 44 are sufficiently deep so that the guiding abutments will not limit the lost motion connection between the disk 34 and the pressure plate 35.

The rear disk 34 and the front pressure plate 35 are preferably provided with complementary peripheral grooves 45 and 46 which cooperate to form an annular peripheral channel about the gate 17. Each of the grooves has a pair of outwardly bowed portions indicated by 47 and 48 and by 49 and 50 to accommodate the upper and lower end portions of the shaft 18.

An annular resilient sealing ring 51, preferably made of rubber, is positioned in the peripheral channel provided by the two grooves 45 and 46, and has a pair of circular portions 52 and 53 which fit about the upper and lower end portions of the shaft 18 and rest in the bowed portions 47—50, of the grooves 45 and 46. The sealing ring 51 is preferably trapezoidal in cross section so that it cannot be easily rolled out of its seated position within the annular channel of the gate 17 by the pressure on the outer face of the front pressure plate 35.

The amount of lost motion clearance between the disk 34 and pressure plate 35 may be varied in two ways. The nuts 39 on the bolts 38 can be adjusted to regulate the upper limit of movement of the pressure plate as desired. In addition, a number of set screws 54 are threaded into the rear disk 34 so that they may be rotatably advanced into the clearance space 55 between the disk 34 and the pressure plate 35. Thus the set screws 54 function as stop members to determine the lower limit of movement of the pressure plate 35 toward the rear disk 34.

In order to prepare the butterfly valve for a particular operation after it has been assembled, the gate 17 is turned to closed position. The bolts 38 and nuts 39 are then adjusted to bring the complementary grooves 45 and 46 closer together so that they press upon the seated portion of the sealing ring 51 and urge the ring 51 outwardly into light sealing engagement with the valve seat 31. The set screws or stop members 54 are next adjusted to their proper position where they may limit the extent of the rearward movement of the pressure plate 35. The proper adjustment may be approximately determined by knowing the size of the valve and the pressure which it must withstand. The desired pressure is then exerted upon the pressure plate 35 moving it rearwardly against the stops 54 and fully seating the ring 51 in sealing engagement against the valve seat 31. If it is desired to modify the pressure on the ring 51, the set screws may be adjusted to limit further, or to extend the lost motion connection between the rear disk 34 and the pressure plate 35. In this manner the butterfly valve may be very quickly and efficiently adjusted so that the sealing engagement at the pressure at which the valve is desired to be operated can be precisely determined ahead of time. The valve can be properly adjusted so no leakage will occur, and yet the adjustment may be regulated so that the pressure on the sealing ring will not be excessive and injure the sealing ring or hinder turning of the valve.

Figs. 8 and 9 illustrate another embodiment of the invention which functions in the same general manner as the preferred form but has some slight differences in structure. As can be seen in Fig. 9, a valve shaft 60 is journaled at its opposite ends in a conventional manner in a valve housing 61, the shaft 60 being offset rearwardly from a rear valve disk 62 and being secured to, and passing through, a pair of rearward projections 63 and 64 formed integrally with the disk 62. As in the preferred form, a lost motion connection is provided between the rear valve disk 62 and a front pressure plate 65 by a number of bolts 66 and nuts 67, and the extent of movement permitted by the connection is regulated either by the nuts 67 on the bolts 66 or by a number of set screws 68.

A pair of complementary annular grooves 69 and 70 are provided in the pressure plate 65 and the valve disk 62 to form an annular seat for an O-ring seal 71; and guiding abutments 72 and 73 on the valve disk 62 which are adapted to be received in cooperating recessed portions, 74 and 75, in the pressure plate 65 assist in maintaining the pressure plate 65 in concentric alignment with the disk 62. As in the preferred form, when pressure is applied to the pressure plate 65, the seated portion of the O-ring seal 71 is pressed between the two grooves, 69 and 70, and the seal is urged outwardly into sealing engagement with a valve seat 76 in the housing 61.

In Figs. 10 and 11, a second modified form of the invention is shown which is slightly different structurally, but which functions in the same general way as the preferred form. A rear valve disk 80 is provided with a passageway to receive a skewed shaft 81 which is secured to the disk 80 by taper pins 82, and is journaled in a valve housing 83 in a conventional manner.

As in the other two embodiments of the invention, a lost motion connection is provided between the disk 80 and a front pressure plate 84 by bolts 85 and nuts 86, and the limit of rearward movement of the pressure plate 84 toward the disk 80 may be varied by adjusting a number of set screws 88 in the disk 80. While the first two embodiments had pressure plates covering substantially the entire forward face of the valve gate, it should be noted that the pressure plate 84 is annular in shape, and covers only the outer edge portions of the disk 80. The pressure plate 84 is of a size to make a close sliding fit about an annular shoulder 87 on the front face of the valve disk 80 to maintain the disk 80 and the pressure plate 84 in concentric alignment. An O-ring seal 93 is preferably recessed in the inner annular surface of the pressure plate 84 to provide sealing engagement between the pressure plate 84 and the shoulder 87 so that fluid under pressure cannot get between the rear face of the pressure plate 84 and the forward face of the valve disk 80 and restrict rearward movement of the pressure plate.

A pair of complementary annular grooves 89 and 90, provide a seat for a sealing ring 91, and when upstream pressure moves the pressure plate 84 rearwardly, the sealing ring 91 is urged into sealing engagement with an annular seat 92 in the housing 83, as with the other two embodiments of the invention.

The foregoing detailed description is given for clearness of understanding only and no unnecessary limitations should be understood therefrom, for some modifications will be obvious to those skilled in the art.

We claim:

1. A butterfly valve, comprising: a valve housing having an annular seat; a rotatable shaft journaled in the housing and a valve gate carried by the shaft for opening and closing the valve cooperatively with said seat; a resilient sealing ring positioned on the periphery of the gate for contacting said seat; and a pressure plate secured to the gate and having a peripheral portion holding said sealing ring in position on the gate, said pressure plate being movable toward the gate a limited distance under influence of upstream pressure thereon to press the sealing ring outwardly into sealing engagement with the seat.

2. A butterfly valve as specified in claim 1 wherein the valve gate is secured off center of the shaft and the pressure plate covers substantially the whole upstream face of the valve gate.

3. A butterfly valve as specified in claim 1 wherein the pressure plate has a lost motion connection with the valve gate and is maintained substantially in concentric alignment with the gate by guiding abutments.

4. A butterfly valve, comprising: a valve housing having an annular seat; a rotatable shaft journaled in the housing and a valve gate carried by the shaft for opening and closing the valve cooperatively with said seat; a resilient sealing ring positioned on the periphery of the gate for contacting said seat; a pressure plate secured to the gate and having a peripheral portion holding said sealing ring in position on the gate, said pressure plate being movable toward the gate a limited distance under influence of upstream pressure to press the sealing ring outwardly into sealing engagement with the seat, and an adjustable stop member for limiting the movement of the pressure plate toward the valve gate to a predetermined selected position for regulating the pressure of the sealing ring against the seat.

5. A butterfly valve, comprising: a valve body having an annular seat; a rotary shaft in the valve body with a butterfly gate secured to the shaft; a pressure plate on the upstream side of the gate and having a lost motion connection with the gate, said plate and gate having complementary recesses forming a peripheral groove about the gate; and a resilient sealing ring lodged in said groove for contacting the valve seat, said pressure plate being movable toward the gate under influence of fluid pressure thereon to squeeze the resilient ring outward into tight sealing contact against the valve seat.

6. A butterfly valve as specified in claim 5 wherein the valve gate is positioned on one side of the rotary shaft and the pressure plate extends over substantially the entire upstream face of the gate.

7. A butterfly valve as specified in claim 5 wherein the rotary shaft passes through the valve gate in a skewed position relative to the housing and the pressure plate is annular with sealing means between the gate and plate to prevent the entrance of upstream pressure between the gate and plate.

8. A butterfly valve, comprising: a valve housing having an annular valve seat; a rotatable shaft in the housing and a valve gate carried by the shaft for opening and closing the valve cooperatively with said seat; a pressure plate secured to the upstream face of the gate with a lost motion connection permitting limited movement of the plate relative to the gate; abutment means on the gate guiding movement of the pressure plate; means forming complementary recesses on the periphery of the gate and pressure plate together forming an annular groove; and a resilient sealing ring resting in said groove for contacting the valve seat, said pressure plate being movable under influence of upstream pressure to press against the sealing ring forcing the ring outwardly in tight sealing contact with the valve seat.

References Cited in the file of this patent

UNITED STATES PATENTS

| | | |
|---|---|---|
| 1,014,775 | Rothchild | Jan. 16, 1912 |
| 1,591,903 | White | July 6, 1926 |
| 1,671,069 | De Wein | May 22, 1928 |
| 1,682,075 | Foulds | Aug. 28, 1928 |
| 2,385,510 | Harwood | Sept. 25, 1945 |
| 2,586,927 | Fantz | Feb. 26, 1952 |
| 2,655,942 | Dougherty | Oct. 20, 1953 |
| 2,754,846 | Ray | July 17, 1956 |

FOREIGN PATENTS

| | | |
|---|---|---|
| 1,109,352 | France | Sept. 21, 1955 |